US008174688B2

(12) United States Patent
Shi et al.

(10) Patent No.: US 8,174,688 B2
(45) Date of Patent: May 8, 2012

(54) METHOD OF DETERMINING NUMBER OF LIGHT SOURCES

(75) Inventors: Shih-Chen Shi, Taipei (TW); Yi-Ting Chao, Taipei (TW); Yu-Ju Liu, Taipei (TW)

(73) Assignee: Everlight Electronics Co., Ltd., New Taipei (TW)

( * ) Notice: Subject to any disclaimer, the term of this patent is extended or adjusted under 35 U.S.C. 154(b) by 263 days.

(21) Appl. No.: 12/703,786

(22) Filed: Feb. 11, 2010

(65) Prior Publication Data

US 2011/0109899 A1 May 12, 2011

(30) Foreign Application Priority Data

Nov. 6, 2009 (TW) .............................. 98137835 A

(51) Int. Cl.
*G01J 1/02* (2006.01)

(52) U.S. Cl. ...................................................... 356/213

(58) Field of Classification Search ........................ None
See application file for complete search history.

(56) References Cited

U.S. PATENT DOCUMENTS 7,969,483 B2 * 6/2011 Takasumi .................. 348/224.1

FOREIGN PATENT DOCUMENTS

| | | |
|---|---|---|
| TW | 421993 | 2/2001 |
| TW | 421994 | 2/2001 |

OTHER PUBLICATIONS

Wei Fang et al., "LED as light source for baby leaves production in an environmental controlled chamber," Proceedings of the 4th ISMAB, May 27-29, 2008.

* cited by examiner

*Primary Examiner* — Tu Nguyen

(74) *Attorney, Agent, or Firm* — Jianq Chyun IP Office

(57) ABSTRACT

A method of determining the number of light sources is adapted to determine the number of each kind of light sources of an illumination device. The method includes following steps. A photon number of a single light source of each kind of the light sources is calculated. Next, a number ratio of each kind of the light sources is determined according to a power ratio of each kind of the light sources and the photon number of a single light source of each kind of the light sources. Finally, the number of each kind of the light sources is determined according to the number ratio and a total number of the light sources of the illumination device.

22 Claims, 5 Drawing Sheets

METHOD OF DETERMINING NUMBER OF LIGHT SOURCES

CROSS-REFERENCE TO RELATED APPLICATION

This application claims the priority benefit of Taiwan application serial no. 98137835, filed on Nov. 6, 2009. The entirety of the above-mentioned patent application is hereby incorporated by reference herein and made a part of specification.

BACKGROUND OF THE INVENTION

1. Field of the Invention

The invention relates to a method of determining the number of light sources, and particularly to a method of determine the number of each kind of light sources of an illumination device.

2. Description of Related Art

There are many researches about using light emitting diode (LED) as an artificial light source for plant growth. And wavelength ranges of red, green and blue lights and a ratio of the three color lights which are suitable for plant growth have been obtained through experimentation. A most common ratio of red light to green light to blue light is 10:0:0, 9:0:1, 8:0:2, or 8:1:1, etc. According to LED as a light source for baby leaves production in an environmental controlled chamber (Proceedings of the $4^{th}$ International Symposium on Machinery and Mechatronics for Agriculture and Biosystems Engineering, Proceedings of the $4^{th}$ ISMAB), plants grow better when an artificial light source with a ratio of red light to green light to blue light is 9:0:1 or 8:0:2.

According to a research, the above ratio of red light to green light to blue light is a power ratio of each kind of light sources, and the power irradiating on plants relates to a photon number within a specific wavelength range. Generally, in the present market, the ratio of red light to green light to blue light is directly represented by the number of each kind of LEDs in related products. For example, if the ratio of red light to green light to blue light is 8:1:1, then a number ratio of red LEDs to green LEDs to blue LEDs is 8:1:1 accordingly.

TW Patent Publication No. 421994 discloses a pot for plant growth including an electrical rail, a plurality of lamps, and a power. The lamp further includes a plurality of red LEDs, green LEDs, and blue LEDs which are arranged randomly. Power is provided through the electrical rail for the lamp to use in planting. Besides, TW Patent Publication No. 421993 discloses a plant growth box having a lamp as well. The lamp includes a plurality of red LEDs, green LEDs, and blue LEDs which are arranged randomly.

However, the power ratio of each kind of light sources is represented by the number of each kind of color LEDs, such that plant growth is adversely affected.

SUMMARY OF THE INVENTION

The invention provides a method of determining the number of light sources, such that an artificial light source suitable for plant growth is provided.

The invention provides a method of determining the number of light sources which is adapted to determine the number of each kind of light sources of an illumination device. The method of determining the number of light sources includes following steps. First, a photon number of a single light source of each kind of the light sources is calculated. Then, a number ratio of each kind of the light sources is determined according to a power ratio of each kind of the light sources and the photon number of the single light source of each kind of the light sources. Finally, the number of each kind of the light sources is determined according to the number ratio and a total number of the light sources of the illumination device.

In an embodiment of the invention, the step of calculating the photon number of the single light source of each kind of the light sources includes respectively calculating a first photon number of a first light source within a first wavelength range, a second photon number of a second light source within a second wavelength range, and a third photon number of a third light source within a third wavelength range. Herein, a ratio of the first photon number to the second photon number to the third photon number is i:j:k, where i, j, k>0.

In an embodiment of the invention, the power ratio of each kind of the light sources of the illumination device is a:b:c, where at least two of a, b, and c are greater than 0.

In an embodiment of the invention, the step of determining the number ratio of each kind of the light sources includes dividing a, b and c respectively by i, j, and k, such that l, m and n are obtained. Herein, l:m:n represents the number ratio of each kind of the light sources and at least two of l, m and n are greater than 0.

In an embodiment of the invention, the first light source is a red light emitting diode (LED), the second light source is a green LED, and the third light source light source is a blue LED.

In an embodiment of the invention, the ratio of the first photon number to the second photon number to the third photon number i:j:k is 0.68:0.44:1.

In an embodiment of the invention, the power ratio of each kind of the light sources of the illumination device a:b:c is 9:0:1.

In an embodiment of the invention, when the total number of the light sources is 108, the number of the first light sources is 100, the number of the second light sources is 0, and the number of the third light sources is 8.

In an embodiment of the invention, when the total number of the light sources is 72, the number of the first light sources is 67, the number of the second light sources is 0, and the number of the third light sources is 5.

In an embodiment of the invention, when the total number of the light sources is 144, the number of the first light sources is 134, the number of the second light sources is 0, and the number of the third light sources is 10.

In an embodiment of the invention, the power ratio of each kind of the light sources of the illumination device a:b:c is 8:0:2.

In an embodiment of the invention, when the total number of the light sources is 108, the number of the first light sources is 92, the number of the second light sources is 0, and the number of the third light sources is 16.

In an embodiment of the invention, when the total number of the light sources is 72, the number of the first light sources is 62, the number of the second light sources is 0, and the number of the third light sources is 10.

In an embodiment of the invention, when the total number of the light sources is 144, the number of the first light sources is 123, the number of the second light sources is 0, and the number of the third light sources is 21.

In an embodiment of the invention, the power ratio of each kind of the light sources of the illumination device a:b:c is 8:1:1.

In an embodiment of the invention, when the total number of the light sources is 108, the number of the first light sources is 85, the number of the second light sources is 16, and the number of the third light sources is 7.

In an embodiment of the invention, when the total number of the light sources is 72, the number of the first light sources is 56, the number of the second light sources is 11, and the number of the third light sources is 5.

In an embodiment of the invention, when the total number of the light sources is 144, the number of the first light sources is 112, the number of the second light sources is 22, and the number of the third light sources is 10.

In an embodiment of the invention, wherein the first wavelength range is from 650 nm to 670 nm.

In an embodiment of the invention, wherein the second wavelength range is from 515 nm to 535 nm.

In an embodiment of the invention, wherein the third wavelength range is from 440 nm to 460 nm.

In an embodiment of the invention, wherein the illumination device is an artificial light illumination device for plant growth.

Based on the above, in the embodiment of the invention, a photon number of a single light source of each kind of the light sources is first calculated, and then a number ratio of each kind of the light sources is determined according to a power ratio of each kind of the light sources. Then, together with a total number of the light sources, the number of each kind of the light sources is determined. Hence, by applying the method of the invention, an illumination device is able to supply an artificial light source having a correct energy ratio which promotes plant growth.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
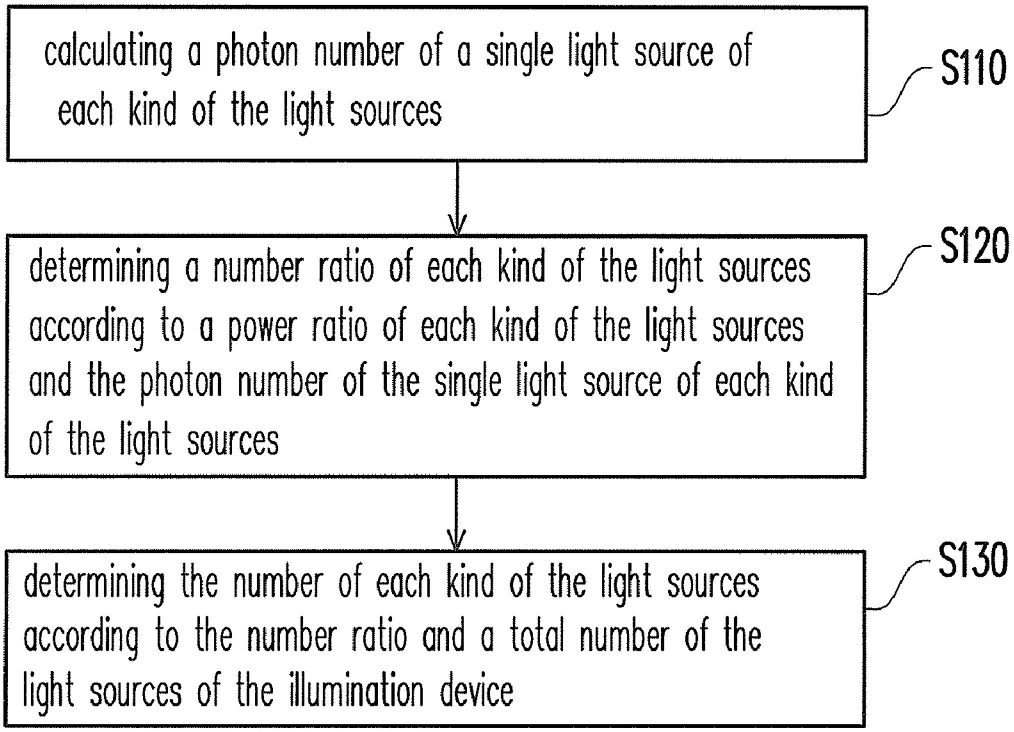
FIG. 1 is a flow chart of a method of determining the number of light sources in an embodiment of the invention.

FIG. 1 is a flow chart of a method of determining the number of light sources in an embodiment of the invention. The method is adapted to determine the number of each kind of light sources of an illumination device, wherein the illumination device is for example, an artificial light illumination device for plant growth. Referring to FIG. 1, the method of determining the number of light sources includes the following steps. First, a photon number of a single light source of each kind of the light sources is calculated (step S110). Then, a number ratio of each kind of the light sources is determined according to a power ratio of each kind of the light sources and the photon number of the single light source of each kind of the light sources (step S120). Finally, the number of each kind of the light sources is determined according to the number ratio and a total number of the light sources of the illumination device (step S130).

Figure 2:
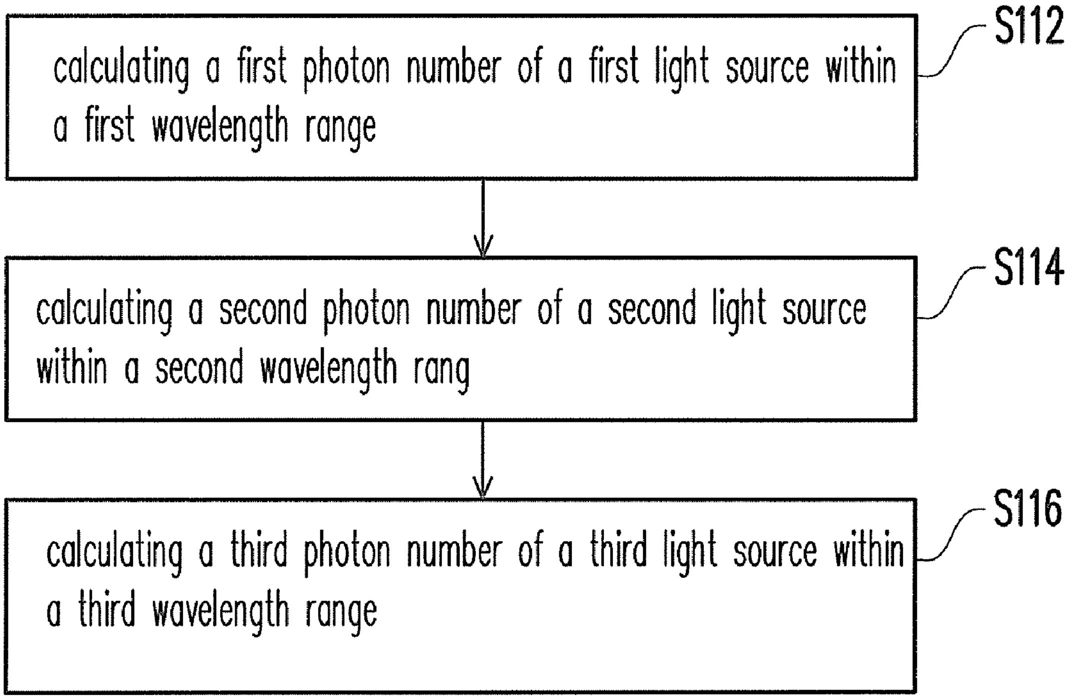
FIG. 2 is a detailed flow chart of the method of determining the number of light sources of FIG. 1.

FIG. 2 is a detailed flow chart of the method of determining the number of light sources of FIG. 1. Referring to both FIG. 1 and FIG. 2, in detail, step S110 may include steps S112~S116, for example. First, a first photon number of a first light source within a first wavelength range is calculated (step S112). Then, a second photon number of a second light source within a second wavelength range is calculated (step S114). Finally, a third photon number of a third light source within a third wavelength range is calculated (step S116). Then, a ratio of the first photon number to the second photon number to the third photon number is i:j:k, where i, j, k>0.

On the other hand, the first light source, the second light source, and the third light source are respectively a red light emitting diode (LED), a green LED, and a blue LED in the embodiment. However, in another embodiment, the kinds of the light sources is not limited to three kinds, and the sequence of steps of S112~S116 is not limited to the description mentioned above.

Figure 3:
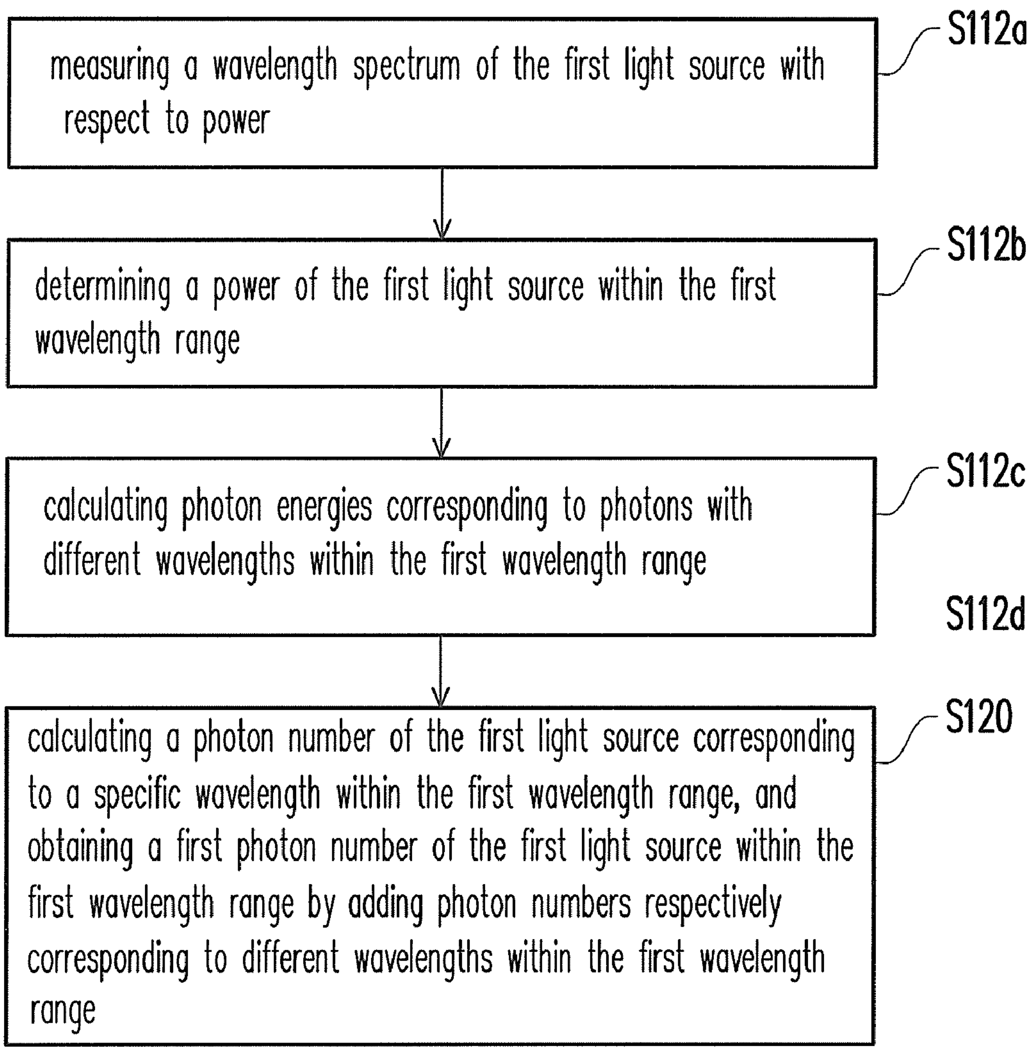
FIG. 3 is a detailed flow chart of step S112 of FIG. 2.
Figure 4:
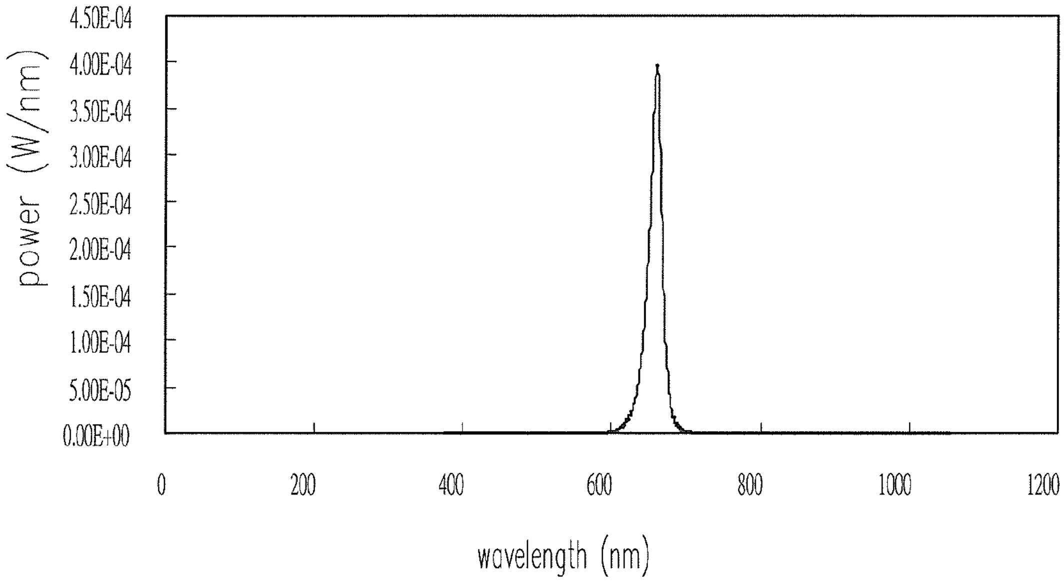
FIG. 4 is a wavelength spectrum of a first light source with respect to power.

In the following, a detailed description of step S112 is provided, and FIG. 3 is a detailed flow chart of step S112 of FIG. 2. As shown in FIG. 3, the calculation method of step S112 mainly includes steps S112*a*~S112*d*. First, a wavelength spectrum of the first light source with respect to power is measured (step S112*a*) as shown in FIG. 4. FIG. 4 is a wavelength spectrum of the first light source with respect to power, and parts data thereof are organized as shown in Table 1, wherein $\lambda_i$ represents wavelength (nm) and $P_i$ represents the power (W/nm) corresponding to wavelength $\lambda_i$.

TABLE 1

| i | $\lambda_i$ (nm) | $P_i$ (W/nm) |
|---|---|---|
| 1 | 650.0537 | 0.0002103 |
| 2 | 650.7772 | 0.0002239 |
| 3 | 651.5007 | 0.0002383 |
| 4 | 652.2242 | 0.0002526 |
| 5 | 652.9477 | 0.0002687 |
| 6 | 653.6712 | 0.0002842 |
| 7 | 654.3947 | 0.0003009 |
| 8 | 655.1182 | 0.0003188 |
| 9 | 655.8416 | 0.0003338 |
| 10 | 656.5651 | 0.0003502 |
| 11 | 657.2886 | 0.000364 |
| 12 | 658.0121 | 0.0003769 |
| 13 | 658.7356 | 0.0003881 |
| 14 | 659.4591 | 0.0003942 |
| 15 | 660.1826 | 0.0003958 |
| 16 | 660.9061 | 0.0003948 |
| 17 | 661.6296 | 0.0003856 |
| 18 | 662.353 | 0.0003717 |
| 19 | 663.0765 | 0.0003528 |
| 20 | 663.8 | 0.0003305 |
| 21 | 664.5235 | 0.0003058 |
| 22 | 665.247 | 0.0002792 |
| 23 | 665.9705 | 0.0002523 |
| 24 | 666.694 | 0.000228 |
| 25 | 667.4175 | 0.0002056 |
| 26 | 668.1409 | 0.0001833 |
| 27 | 668.8644 | 0.0001648 |
| 28 | 669.5879 | 0.0001474 |
| 29 | 670.3114 | 0.0001319 |

Referring to both Table 1 and FIG. 4, it should be noted that, area under a curve of FIG. 4 represents the power (Watt) of a single first light source, e.g. red LED light source. In addition, the area under of the curve of FIG. 4 is able to be calculated by using the concept of integration, such that the power of the single first light source is determined. Thus, after step S112*a* is carried out, the power of the first light source within the first wavelength range is able to be determined (step S112*b*). In the embodiment, a central wavelength of the first light source is 660 nm, and the first wavelength range is from 650 nm to 670 nm.

Figure 5:
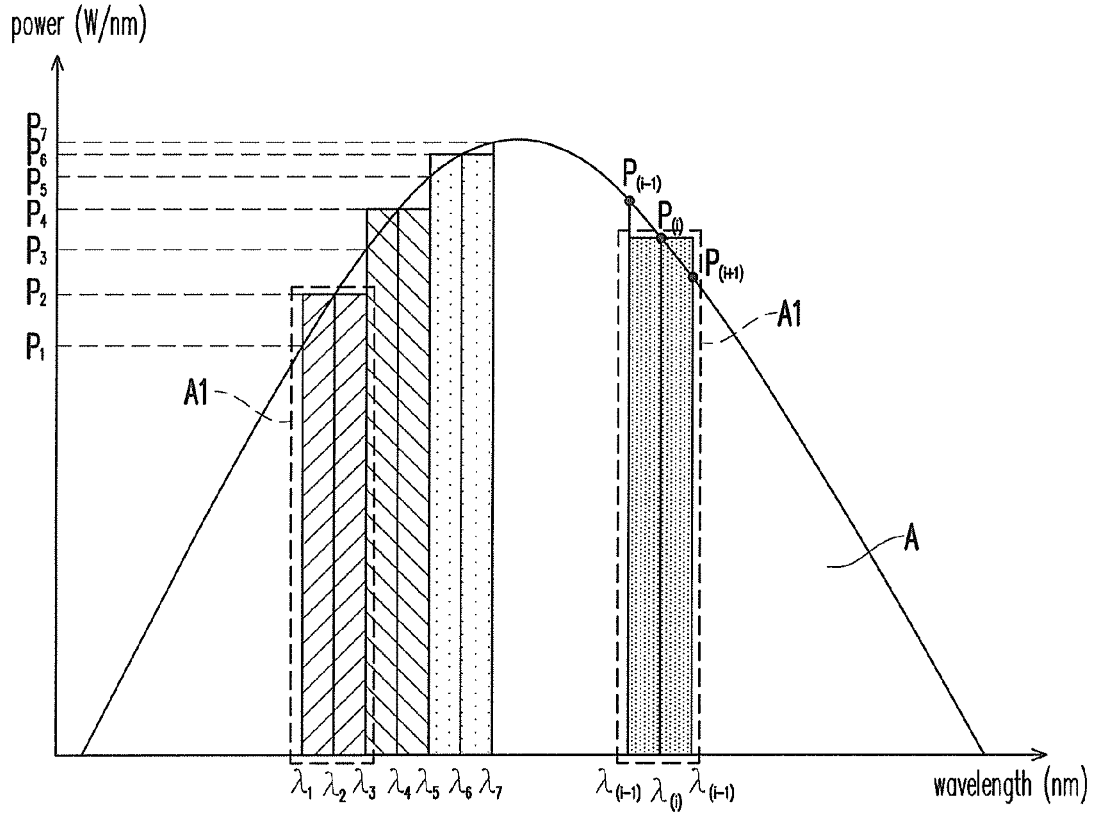
FIG. 5 is another wavelength spectrum with respect to power.

FIG. 5 is another wavelength spectrum with respect to power. FIG. 5 together with Table 2 illustrate how to calculate the area under the curve by integration within a specific wavelength range of FIG. 4. The data of Table 2 corresponds to parts of the data of Table 1.

TABLE 2

| i | λi (nm) | Pi (W/nm) | Δλi (nm) | ΔPi (W) |
|---|---|---|---|---|
| 1 | 650.0537 | 0.0002103 | | |
| 2 | 650.7772 | 0.0002239 | 1.44697 | 0.000324 |
| 3 | 651.5007 | 0.0002383 | | |
| 4 | 652.2242 | 0.0002526 | 1.44698 | 0.000365 |
| 5 | 652.9477 | 0.0002687 | | |
| 6 | 653.6712 | 0.0002842 | 1.44698 | 0.000411 |
| 7 | 654.3947 | 0.0003009 | | |
| 8 | 655.1182 | 0.0003188 | 1.44698 | 0.000461 |
| 9 | 655.8416 | 0.0003338 | | |
| 10 | 656.5651 | 0.0003502 | 1.44697 | 0.000507 |
| 11 | 657.2886 | 0.000364 | | |
| 12 | 658.0121 | 0.0003769 | 1.44698 | 0.000545 |
| 13 | 658.7356 | 0.0003881 | | |
| 14 | 659.4591 | 0.0003942 | 1.44698 | 0.00057 |
| 15 | 660.1826 | 0.0003958 | | |
| 16 | 660.9061 | 0.0003948 | 1.44698 | 0.000571 |
| 17 | 661.6296 | 0.0003856 | | |
| 18 | 662.353 | 0.0003717 | 1.44697 | 0.000538 |
| 19 | 663.0765 | 0.0003528 | | |
| 20 | 663.8 | 0.0003305 | 1.44698 | 0.000478 |
| 21 | 664.5235 | 0.0003058 | | |
| 22 | 665.247 | 0.0002792 | 1.44698 | 0.000404 |
| 23 | 665.9705 | 0.0002523 | | |
| 24 | 666.694 | 0.000228 | 1.44697 | 0.00033 |
| 25 | 667.4175 | 0.0002056 | | |
| 26 | 668.1409 | 0.0001833 | 1.44698 | 0.000265 |
| 27 | 668.8644 | 0.0001648 | | |
| 28 | 669.5879 | 0.0001474 | 1.44698 | 0.000213 |
| 29 | 670.3114 | 0.0001319 | | |

Referring to both FIG. 5 and Table 2, FIG. 5 and Table 2 use groups of three wavelengths, and the powers respectively corresponding to and $\lambda_{i-1}$, $\lambda_i$ and $\lambda_{i+1}$ are all regarded as $P_i$. In addition, $\Delta\lambda_i=\lambda_{i+1}-\lambda_{i-1}$. Hence, the area A under curve of FIG. 5 is able to be regarded as consisting of a plurality of areas A1, wherein A1$=\Delta\lambda_i\times P_i$. In the embodiment, the area A1 represents power $\Delta P_i$ contributed by all photons with wavelength $\lambda_i$.

For example, when wavelengths $\lambda_1$, $\lambda_2$ and $\lambda_3$ of FIG. 5 are respective 650.0537, 650.7772 and 651.5007 (i.e. $\lambda_1=650.0537$, $\lambda_2=650.7772$, and $\lambda_3=651.5007$), the area A1 corresponds to the section between wavelength $\lambda_1$ and wavelength $\lambda_3$ equals to $(\lambda_3-\lambda_1)\times P_2=1.44697\times2.24\times10^{-4}=3.24\times10^{-4}$. In other words, $3.24\times10^{-4}$ is power $\Delta P_2$ to which photons with wavelength $\lambda_2$ contributed. Accordingly, the power of the first light source within the first wavelength range is able to be calculated by adding the powers $\Delta P_i$ together within the first wavelength range.

Then, photon energies corresponding to photons with different wavelengths within the first wavelength range is calculated (step S112*c*). And the photon energies (Joule) of photons with different wavelengths are calculated by, for example, using the formula $E=h\nu=hc/\lambda$, where h is Planck's constant equal to 6.6263×10-34 (Js) and c is velocity of light equal to $3\times10^8$ (m/s). Thus, the photon energies respectively corresponding to different wavelengths are able to be calculated by the simplified equation, i.e. E (J)$=1.9865\times10^{-16}/\lambda$ (nm), wherein results thereof are organized as shown in Table 3.

TABLE 3

| i | λi (nm) | Pi (W/nm) | Ei (J) | Δλi (nm) | ΔPi (W) |
|---|---|---|---|---|---|
| 1 | 650.0537 | 0.0002103 | $3.05586\times10^{-19}$ | | |
| 2 | 650.7772 | 0.0002239 | $3.05247\times10^{-19}$ | 1.44697 | 0.000324 |
| 3 | 651.5007 | 0.0002383 | $3.04908\times10^{-19}$ | | |
| 4 | 652.2242 | 0.0002526 | $3.04569\times10^{-19}$ | 1.44698 | 0.000365 |
| 5 | 652.9477 | 0.0002687 | $3.04232\times10^{-19}$ | | |
| 6 | 653.6712 | 0.0002842 | $3.03895\times10^{-19}$ | 1.44698 | 0.000411 |
| 7 | 654.3947 | 0.0003009 | $3.03559\times10^{-19}$ | | |
| 8 | 655.1182 | 0.0003188 | $3.03224\times10^{-19}$ | 1.44698 | 0.000461 |
| 9 | 655.8416 | 0.0003338 | $3.02889\times10^{-19}$ | | |
| 10 | 656.5651 | 0.0003502 | $3.02556\times10^{-19}$ | 1.44697 | 0.000507 |
| 11 | 657.2886 | 0.000364 | $3.02223\times10^{-19}$ | | |
| 12 | 658.0121 | 0.0003769 | $3.0189\times10^{-19}$ | 1.44698 | 0.000545 |
| 13 | 658.7356 | 0.0003881 | $3.01559\times10^{-19}$ | | |
| 14 | 659.4591 | 0.0003942 | $3.01228\times10^{-19}$ | 1.44698 | 0.00057 |
| 15 | 660.1826 | 0.0003958 | $3.00898\times10^{-19}$ | | |
| 16 | 660.9061 | 0.0003948 | $3.00568\times10^{-19}$ | 1.44698 | 0.000571 |
| 17 | 661.6296 | 0.0003856 | $3.0024\times10^{-19}$ | | |
| 18 | 662.353 | 0.0003717 | $2.99912\times10^{-19}$ | 1.44697 | 0.000538 |
| 19 | 663.0765 | 0.0003528 | $2.99585\times10^{-19}$ | | |
| 20 | 663.8 | 0.0003305 | $2.99258\times10^{-19}$ | 1.44698 | 0.000478 |
| 21 | 664.5235 | 0.0003058 | $2.98932\times10^{-19}$ | | |
| 22 | 665.247 | 0.0002792 | $2.98607\times10^{-19}$ | 1.44698 | 0.000404 |
| 23 | 665.9705 | 0.0002523 | $2.98283\times10^{-19}$ | | |
| 24 | 666.694 | 0.000228 | $2.97959\times10^{-19}$ | 1.44697 | 0.00033 |
| 25 | 667.4175 | 0.0002056 | $2.97636\times10^{-19}$ | | |
| 26 | 668.1409 | 0.0001833 | $2.97314\times10^{-19}$ | 1.44698 | 0.000265 |
| 27 | 668.8644 | 0.0001648 | $2.96992\times10^{-19}$ | | |
| 28 | 669.5879 | 0.0001474 | $2.96671\times10^{-19}$ | 1.44698 | 0.000213 |
| 29 | 670.3114 | 0.0001319 | $2.96351\times10^{-19}$ | | |

For example, as shown in Table 3, the photon energy which $\lambda_2=650.7772$ (nm) corresponds to is $E_2(J)=1.9865\times10^{-16}/\lambda_2$ (nm)$=3.05247\times10^{-19}$ (J). On the other hand, the photon energy can be represented in electron volt (eV), i.e. E(eV)=12400/λ(Å). Thus, $E_2(eV)=12400/\lambda_2(Å)=12400/6507.772$ (Å)=1.9057 (eV)○

Finally, step S112*d* is performed. A photon number of the first light source corresponding to a specific wavelength within the first wavelength range is calculated, and then a first photon number of the first light source within the first wavelength range is obtained by adding the photon numbers respectively corresponding to different wavelengths within the first wavelength range. Since $\Delta P_i=E_i\times n_i$, where $n_i$ is the photon number corresponding to wavelength $\lambda_i$, the photon number corresponding to a specific wavelength is able to be obtained by dividing $\Delta P_i$ by $E_i$, and results are organized as shown in Table 4.

TABLE 4

| i | λi (nm) | Pi (W/nm) | Ei (J) | ΔPi (W) | photon number |
|---|---|---|---|---|---|
| 1 | 650.0537 | 0.0002103 | $3.05586\times10^{-19}$ | | |
| 2 | 650.7772 | 0.0002239 | $3.05247\times10^{-19}$ | 0.000324 | $1.06134\times10^{15}$ |
| 3 | 651.5007 | 0.0002383 | $3.04908\times10^{-19}$ | | |
| 4 | 652.2242 | 0.0002526 | $3.04569\times10^{-19}$ | 0.000365 | $1.19986\times10^{15}$ |
| 5 | 652.9477 | 0.0002687 | $3.04232\times10^{-19}$ | | |
| 6 | 653.6712 | 0.0002842 | $3.03895\times10^{-19}$ | 0.000411 | $1.35329\times10^{15}$ |
| 7 | 654.3947 | 0.0003009 | $3.03559\times10^{-19}$ | | |
| 8 | 655.1182 | 0.0003188 | $3.03224\times10^{-19}$ | 0.000461 | $1.52108\times10^{15}$ |
| 9 | 655.8416 | 0.0003338 | $3.02889\times10^{-19}$ | | |

TABLE 4-continued

| i | λi (nm) | Pi (W/nm) | Ei (J) | ΔPi (W) | photon number |
|---|---|---|---|---|---|
| 10 | 656.5651 | 0.0003502 | $3.02556 \times 10^{-19}$ | 0.000507 | $1.67495 \times 10^{15}$ |
| 11 | 657.2886 | 0.000364 | $3.02223 \times 10^{-19}$ | | |
| 12 | 658.0121 | 0.0003769 | $3.0189 \times 10^{-19}$ | 0.000545 | $1.80652 \times 10^{15}$ |
| 13 | 658.7356 | 0.0003881 | $3.01559 \times 10^{-19}$ | | |
| 14 | 659.4591 | 0.0003942 | $3.01228 \times 10^{-19}$ | 0.00057 | $1.89346 \times 10^{15}$ |
| 15 | 660.1826 | 0.0003958 | $3.00898 \times 10^{-19}$ | | |
| 16 | 660.9061 | 0.0003948 | $3.00568 \times 10^{-19}$ | 0.000571 | $1.90064 \times 10^{15}$ |
| 17 | 661.6296 | 0.0003856 | $3.0024 \times 10^{-19}$ | | |
| 18 | 662.353 | 0.0003717 | $2.99912 \times 10^{-19}$ | 0.000538 | $1.79325 \times 10^{15}$ |
| 19 | 663.0765 | 0.0003528 | $2.99585 \times 10^{-19}$ | | |
| 20 | 663.8 | 0.0003305 | $2.99258 \times 10^{-19}$ | 0.000478 | $1.59821 \times 10^{15}$ |
| 21 | 664.5235 | 0.0003058 | $2.98932 \times 10^{-19}$ | | |
| 22 | 665.247 | 0.0002792 | $2.98607 \times 10^{-19}$ | 0.000404 | $1.35316 \times 10^{15}$ |
| 23 | 665.9705 | 0.0002523 | $2.98283 \times 10^{-19}$ | | |
| 24 | 666.694 | 0.000228 | $2.97959 \times 10^{-19}$ | 0.00033 | $1.107 \times 10^{15}$ |
| 25 | 667.4175 | 0.0002056 | $2.97636 \times 10^{-19}$ | | |
| 26 | 668.1409 | 0.0001833 | $2.97314 \times 10^{-19}$ | 0.000265 | $8.92212 \times 10^{14}$ |
| 27 | 668.8644 | 0.0001648 | $2.96992 \times 10^{-19}$ | | |
| 28 | 669.5879 | 0.0001474 | $2.96671 \times 10^{-19}$ | 0.000213 | $7.19089 \times 10^{14}$ |
| 29 | 670.3114 | 0.0001319 | $2.96351 \times 10^{-19}$ | | |

As shown in Table 4, when $\lambda_2$=650.7772 and $\Delta P_2$=$3.24\times 10^{-4}$, the photon number corresponding to wavelength $\lambda_2$ equals to $\Delta P_2 \div E_2 = 1.06134\times10^{15}$. Accordingly, the first photon number of the first light source within the first wavelength range is able to be obtained by adding the photon numbers respectively corresponding to different wavelengths within the first wavelength range. In the embodiment, the first photon number within the first wavelength range is $1.9874\times10^{16}$ equal to $3.31234\times10^{-8}$ mole. Thereby, the first photon number of the first light source within the first wavelength range is obtained (step S112).

Similarly, the second photon number of the second light source within the second wavelength range and the third photon number of the third light source within the third wavelength range are able to be calculated (i.e. steps S114 and S116) by using the same concept mentioned above. Detailed steps can be referred to steps S112*a*~S112*d*, and thus no further description is provided hereinafter. It should be mentioned that the method of calculating the photon number mentioned in steps S112*a*~S112*d* should be regarded as an example only and not as a limitation to the invention.

On the other hand, a central wavelength of the second light source of the embodiment (e.g. a green light emitting diode) is 525 nm, and the second wavelength range is from 515 nm to 535 nm. Furthermore, a central wavelength of the third light source of the embodiment (e.g. a blue light emitting diode) is 450 nm, and the third wavelength range is from 440 nm to 460 nm. Herein photon numbers respectively corresponding to different wavelengths within the second wavelength range and the third wavelength range are organized as shown in Table 5 and Table 6.

TABLE 5

| i | λi (nm) | Pi (W/nm) | Ei (J) | Δ λi (nm) | Δ Pi (W) | photon number |
|---|---|---|---|---|---|---|
| 1 | 515.5777 | 0.000231 | $3.8529 \times 10^{-19}$ | | | |
| 2 | 516.3787 | 0.000241 | $3.8469 \times 10^{-19}$ | 1.6 | $3.86 \times 10^{-4}$ | $1 \times 10^{15}$ |
| 3 | 517.1797 | 0.000252 | $3.841 \times 10^{-19}$ | | | |
| 4 | 517.9808 | 0.000257 | $3.835 \times 10^{-19}$ | 1.6 | $4.12 \times 10^{-4}$ | $1.08 \times 10^{15}$ |
| 5 | 518.7818 | 0.000265 | $3.8291 \times 10^{-19}$ | | | |
| 6 | 519.5828 | 0.000269 | $3.8232 \times 10^{-19}$ | 1.6 | $4.31 \times 10^{-4}$ | $1.13 \times 10^{15}$ |
| 7 | 520.3838 | 0.000275 | $3.8173 \times 10^{-19}$ | | | |
| 8 | 521.1848 | 0.000281 | $3.8115 \times 10^{-19}$ | 1.6 | $4.5 \times 10^{-4}$ | $1.18 \times 10^{15}$ |
| 9 | 521.9858 | 0.00028 | $3.8056 \times 10^{-19}$ | | | |
| 10 | 522.7868 | 0.000281 | $3.7798 \times 10^{-19}$ | 1.6 | $4.5 \times 10^{-4}$ | $1.18 \times 10^{15}$ |
| 11 | 523.5878 | 0.000281 | $3.794 \times 10^{-19}$ | | | |
| 12 | 524.3888 | 0.000279 | $3.7882 \times 10^{-19}$ | 1.6 | $4.46 \times 10^{-4}$ | $1.18 \times 10^{15}$ |
| 13 | 525.1898 | 0.000275 | $3.7824 \times 10^{-19}$ | | | |
| 14 | 525.9908 | 0.00027 | $3.7766 \times 10^{-19}$ | 1.6 | $4.33 \times 10^{-4}$ | $1.15 \times 10^{15}$ |
| 15 | 526.7918 | 0.000271 | $3.7709 \times 10^{-19}$ | | | |
| 16 | 527.5928 | 0.00026 | $3.7652 \times 10^{-19}$ | 1.6 | $4.17 \times 10^{-4}$ | $1.11 \times 10^{15}$ |
| 17 | 528.3938 | 0.000257 | $3.7595 \times 10^{-19}$ | | | |
| 18 | 529.1949 | 0.000247 | $3.7538 \times 10^{-19}$ | 1.6 | $3.95 \times 10^{-4}$ | $1.05 \times 10^{15}$ |
| 19 | 529.9959 | 0.000247 | $3.7481 \times 10^{-19}$ | | | |
| 20 | 530.7969 | 0.000235 | $3.7424 \times 10^{-19}$ | 1.6 | $3.77 \times 10^{-4}$ | $1.01 \times 10^{15}$ |
| 21 | 531.5979 | 0.000226 | $3.7368 \times 10^{-19}$ | | | |
| 22 | 532.3989 | 0.000223 | $3.7312 \times 10^{-19}$ | 1.6 | $3.56 \times 10^{-4}$ | $9.55 \times 10^{14}$ |
| 23 | 533.1999 | 0.000214 | $3.7256 \times 10^{-19}$ | | | |
| 24 | 534.0009 | 0.000206 | $3.72 \times 10^{-19}$ | 1.6 | $3.29 \times 10^{-4}$ | $8.85 \times 10^{14}$ |
| 25 | 534.8019 | 0.000198 | $3.7144 \times 10^{-19}$ | | | |
| 26 | 535.6029 | 0.000191 | $3.7089 \times 10^{-19}$ | | | |

TABLE 6

| i | $\lambda_i$ (nm) | $P_i$ (W/nm) | $E_i$ (J) | $\Delta\lambda_i$ (nm) | $\Delta P_i$ (W) | photon number |
|---|---|---|---|---|---|---|
| 1 | 440.1938 | $3.83 \times 10^{-4}$ | $4.51273 \times 10^{-19}$ | | | |
| 2 | 440.903 | $4.12 \times 10^{-4}$ | $4.50547 \times 10^{-19}$ | 1.42 | $5.85 \times 10^{-4}$ | $1.3 \times 10^{15}$ |
| 3 | 441.6123 | $4.45 \times 10^{-4}$ | $4.49823 \times 10^{-19}$ | | | |
| 4 | 442.3215 | $4.76 \times 10^{-4}$ | $4.49102 \times 10^{-19}$ | 1.42 | $6.75 \times 10^{-4}$ | $1.5 \times 10^{15}$ |
| 5 | 443.0308 | $5.1 \times 10^{-4}$ | $4.48383 \times 10^{-19}$ | | | |
| 6 | 443.74 | $5.41 \times 10^{-4}$ | $4.47666 \times 10^{-19}$ | 1.42 | $7.67 \times 10^{-4}$ | $1.71 \times 10^{15}$ |
| 7 | 444.4493 | $5.71 \times 10^{-4}$ | $4.46952 \times 10^{-19}$ | | | |
| 8 | 445.1585 | $6 \times 10^{-4}$ | $4.4624 \times 10^{-19}$ | 1.42 | $8.52 \times 10^{-4}$ | $1.91 \times 10^{15}$ |
| 9 | 445.8678 | $6.28 \times 10^{-4}$ | $4.4553 \times 10^{-19}$ | | | |
| 10 | 446.577 | $6.54 \times 10^{-4}$ | $4.44822 \times 10^{-19}$ | 1.42 | $9.28 \times 10^{-4}$ | $2.09 \times 10^{15}$ |
| 11 | 447.2863 | $6.79 \times 10^{-4}$ | $4.44117 \times 10^{-19}$ | | | |
| 12 | 447.9955 | $6.95 \times 10^{-4}$ | $4.43414 \times 10^{-19}$ | 1.42 | $9.86 \times 10^{-4}$ | $2.22 \times 10^{15}$ |
| 13 | 448.7048 | $7.08 \times 10^{-4}$ | $4.42713 \times 10^{-19}$ | | | |
| 14 | 449.414 | $716 \times 10^{-4}$ | $4.42014 \times 10^{-19}$ | 1.42 | $1.02 \times 10^{-3}$ | $2.3 \times 10^{15}$ |
| 15 | 450.1233 | $7.19 \times 10^{-4}$ | $4.41318 \times 10^{-19}$ | | | |
| 16 | 450.8325 | $7.16 \times 10^{-4}$ | $4.40624 \times 10^{-19}$ | 1.42 | $1.02 \times 10^{-3}$ | $2.31 \times 10^{15}$ |
| 17 | 451.5418 | $7.09 \times 10^{-4}$ | $4.39932 \times 10^{-19}$ | | | |
| 18 | 452.251 | $6.93 \times 10^{-4}$ | $4.39242 \times 10^{-19}$ | 1.42 | $9.83 \times 10^{-4}$ | $2.24 \times 10^{15}$ |
| 19 | 452.9603 | $6.75 \times 10^{-4}$ | $4.38554 \times 10^{-19}$ | | | |
| 20 | 453.6695 | $6.53 \times 10^{-4}$ | $4.37868 \times 10^{-19}$ | 1.42 | $9.26 \times 10^{-4}$ | $2.11 \times 10^{15}$ |
| 21 | 454.3788 | $6.26 \times 10^{-4}$ | $4.37185 \times 10^{-19}$ | | | |
| 22 | 455.088 | $5.98 \times 10^{-4}$ | $4.36503 \times 10^{-19}$ | 1.42 | $8.49 \times 10^{-4}$ | $1.94 \times 10^{15}$ |
| 23 | 455.7973 | $5.69 \times 10^{-4}$ | $4.35824 \times 10^{-19}$ | | | |
| 24 | 456.5065 | $5.37 \times 10^{-4}$ | $4.35147 \times 10^{-19}$ | 1.42 | $7.61 \times 10^{-4}$ | $1.75 \times 10^{15}$ |
| 25 | 457.2158 | $5.06 \times 10^{-4}$ | $4.34472 \times 10^{-19}$ | | | |
| 26 | 457.925 | $4.75 \times 10^{-4}$ | $4.33799 \times 10^{-19}$ | 1.42 | $6.74 \times 10^{-4}$ | $1.55 \times 10^{15}$ |
| 27 | 458.6343 | $4.46 \times 10^{-4}$ | $4.33128 \times 10^{-19}$ | | | |
| 28 | 459.3435 | $4.18 \times 10^{-4}$ | $4.3246 \times 10^{-19}$ | 1.42 | $5.93 \times 10^{-4}$ | $1.37 \times 10^{15}$ |
| 29 | 460.0528 | $3.91 \times 10^{-4}$ | $4.31793 \times 10^{-19}$ | | | |
| 30 | 460.762 | $3.68 \times 10^{-4}$ | $4.31128 \times 10^{-19}$ | | | |

Accordingly, after the photon numbers of a single light source within each kind of light sources are obtained, the ratio of the first photon number to the second photon number to the third photon number i:j:k is obtained as well, where i, j, k>0. In the embodiment, the ratio of the first photon number to the second photon number to the third photon number i:j:k is 0.68:0.44:1. And the above ratio relates to a power ratio of a single first light source to a single second light source to a single third light source, i.e. relates to a power ratio of a single red:green:blue LED light source in the embodiment. From the above, the power emitted within a specific wavelength range by a single light source of each kind of light sources (e.g. a single LED light source of each kind of color LED light sources) is different.

Thus, if the power ratio of each kind of light sources (e.g. red light, green light and blue light) is directly represented by the number of each kind of color LED light sources, the power ratio of red light to green light to blue light is not correct, such that plant growth is affected.

Besides, in the embodiment, the power ratio of the first light source of the illumination device to the second light source to the third light source is a:b:c. And the power ratio is determined according to the most suitable condition for plant growth. Hence, the number ratio of the first light source to the second light source to the third light source is determined according to the power ratio of the first light source to the second light source to the third light source (step S120). For example, by dividing values a, b and c respectively by values i, j, and k, values l, m and n are able to be obtained. Herein, the ratio l:m:n represents the number ratio of the first light source to the second light source to the third light source, wherein at least two of values l, m and n are greater than 0.

Then, step S130 is carried out. The number of each kind of the light sources (i.e. the number of the first light sources, the number of the second light sources, and the number of the third light sources) is determined according to the number ratio l:m:n and a total number of the light sources of the illumination device. For example, when the total number of the light sources is 108, the power ratio of the first light source to second light source to third light source a:b:c is 9:0:1 and the ratio of the first photon number to the second photon number to the third photon number i:j:k is 0.68:0.44:1, then the number of the first light sources is 100, the number of the second light sources is 0, and the number of the third light sources is 8. Besides, each photon number corresponds to a specific wavelength range.

It should be noted that the number ratio of the first light source to the third light source is about 12.5:1 instead of 9:1 in the conventional art. That is to say, the power ratio of each kind of light sources is not directly represented by the number of each kind of color LED light sources in the embodiment. Besides, since the number of each kind of light sources is an integer, the power ratio of the first light source to the second light source to the third light source is about between 8:0:1 and 10:0:1 in the embodiment.

Furthermore, the first, the second, and the third light sources of the embodiment may be directly fabricated on a printed circuit board (PCB). Thus, the illumination device of the embodiment is able to provide an artificial light source suitable for plant growth, and the power ratio of red light to green light to blue light is a correct power ratio.

On the other hand, when the total number of light sources and the ratio of the first photon number to the second photon number to the third photon number i:j:k are remained the same as the above-mentioned, and the power ratio of the first light source to the second light source to the third light source a:b:c is 8:0:2, the number of the first light sources, the number of the second light sources, and the number of the third light sources are respectively 92, 0, and 16. And power ratio of the first light source to the second light source to the third light source is about between 10:0:2 and 6:0:2 in the embodiment.

On the other hand, when power ratio of the first light source to the second light source to the third light source a:b:c is 8:1:1, the number of the first light sources, the number of the second light sources, and the number of the third light sources are respectively 85, 16, and 7. And power ratio of the first light source to the second light source to the third light source is about between 9:1:1 and 7:1:1 in the embodiment.

Similarly, when the total number of light sources is changed from 108 to 72, the ratio of the first photon number to the second photon number to the third photon number i:j:k is unchanged, and power ratio of the first light source to the second light source to the third light source a:b:c is 9:0:1, then the number of the first light sources, the number of the second light sources, and the number of the third light sources are then respectively 67, 0, and 5. In addition, in order to enhance the irradiation intensity of the artificial light source, the total number of the light sources can be increased to e.g. 144, an integral multiple of 72, according to actual requirements. Thus, the number of the first light sources, the number of the second light sources, and the number of the third light sources are then respectively 134, 0, and 10.

Moreover, when power ratio of the first light source to the second light source to the third light source a:b:c is 8:0:2, then the number of the first light sources, the number of the second light sources, and the number of the third light sources are respectively 62, 0, and 10. Similarly, in order to enhance the irradiation intensity of the artificial light source, the total number of the light sources can be also increased to e.g. 144, an integral multiple of 72, according to actual requirements. Thus, the number of the first light sources, the number of the second light sources, and the number of the third light sources are then respectively 123, 0, and 21.

Besides, when power ratio of the first light source to the second light source to the third light source a:b:c is 8:1:1, the number of the first light sources, the number of the second light sources, and the number of the third light sources are then respectively 56, 11, and 5. In addition, the total number of light sources may be increased depends on the demand of a user, such that intensity of an artificial light source is enhanced. For example, the total number of light sources may be 144, an integral multiple of 72. Hence, the number of the first light sources, the number of the second light sources, and the number of the third light sources are then respectively 112, 22, and 10.

Certainly, when two values in the power ratio of the first light source to the second light source to the third light source are 0 (i.e. two of values a, b and c are 0), there is no need to distribute the number of each kind of light sources. For example, when the power ratio of the first light source to the second light source to the third light source a:b:c is 10:0:0, the number of the first light sources is equal to the total number of light sources.

In summary, the embodiment of the invention converts the required power of each kind of light sources of an illumination device into the number ratio of each kind of light sources. And the method of determining the number of light sources includes calculating the photon number of a single light source of each kind of light sources, determining a number ratio of each kind of light sourced according to a power ratio of each kind of light sourced, and determining the number of each kind of light sources of the illumination device according to the total number of the light sources. Hence, compared with the conventional art in which the required power of each kind of light sourced is directly represented by the number of each kind of color LED light sources, an illumination device applying the method of the embodiment is able to provide artificial light with a correct power ratio which is suitable for plant growth.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method of determining the number of light sources adapted to determine the number of each kind of light sources of an illumination device, the method of determining the number of light sources comprising:

calculating a photon number of a single light source of each kind of the light sources;

determining a number ratio of each kind of the light sources according to a power ratio of each kind of the light sources and the photon number of the single light source of each kind of the light sources; and determining the number of each kind of the light sources according to the number ratio and a total number of the light sources of the illumination device.

2. The method of claim 1, wherein the step of calculating the photon number of the single light source of each kind of the light sources comprises:

calculating a first photon number of a first light source within a first wavelength range;

calculating a second photon number of a second light source within a second wavelength range; and calculating a third photon number of a third light source within a third wavelength range, wherein a ratio of the first photon number to the second photon number to the third photon number is i:j:k, where i, j, k>0.

3. The method of claim 2, wherein the power ratio of each kind of the light sources of the illumination device is a:b:c, where at least two of a, b, and c are greater than 0.

4. The method of claim 3, wherein the step of determining the number ratio of each kind of the light sources according to the power ratio of each kind of the light sources and the photon number of the single light source of each kind of the light sources comprises:

dividing a, b and c respectively by i, j, and k, such that l, m and n are obtained, wherein l:m:n represents the number ratio of each kind of the light sources, and at least two of l, m and n are greater than 0.

5. The method of claim 4, wherein the first light source is a red light emitting diode, the second light source is a green light emitting diode, and the third light source is a blue light emitting diode.

6. The method of claim 5, wherein the ratio of the first photon number to the second photon number to the third photon number i:j:k is 0.68:0.44:1.

7. The method of claim 6, wherein the power ratio of each kind of the light sources of the illumination device a:b:c is 9:0:1.

8. The method of claim 7, wherein when the total number of the light sources is 108, the number of the first light sources is 100, the number of the second light sources is 0, and the number of the third light sources is 8.

9. The method of claim 7, wherein when the total number of the light sources is 72, the number of the first light sources is 67, the number of the second light sources is 0, and the number of the third light sources is 5.

10. The method of claim 7, wherein when the total number of the light sources is 144, the number of the first light sources is 134, the number of the second light sources is 0, and the number of the third light sources is 10.

11. The method of claim 6, wherein the power ratio of each kind of the light sources of the illumination device a:b:c is 8:0:2.

12. The method of claim 11, wherein when the total number of the light sources is 108, the number of the first light sources is 92, the number of the second light sources is 0, and the number of the third light sources is 16.

13. The method of claim 11, wherein when the total number of the light sources is 72, the number of the first light sources is 62, the number of the second light sources is 0, and the number of the third light sources is 10.

14. The method of claim 11, wherein when the total number of the light sources is 144, the number of the first light sources is 123, the number of the second light sources is 0, and the number of the third light sources is 21.

15. The method of claim 6, wherein the power ratio of each kind of the light sources of the illumination device a:b:c is 8:1:1.

16. The method of claim 15, wherein when the total number of the light sources is 108, the number of the first light sources is 85, the number of the second light sources is 16, and the number of the third light sources is 7.

17. The method of claim 15, wherein when the total number of the light sources is 72, the number of the first light sources is 56, the number of the second light sources is 11, and the number of the third light sources is 5.

18. The method of claim 15, wherein when the total number of the light sources is 144, the number of the first light sources is 112, the number of the second light sources is 22, and the number of the third light sources is 10.

19. The method of claim 5, wherein the first wavelength range is from 650 nm to 670 nm.

20. The method of claim 5, wherein the second wavelength range is from 515 nm and 535 nm.

21. The method of claim 5, wherein the third wavelength range is from 440 nm and 460 nm.

22. The method of claim 1, wherein the illumination device is an artificial light illumination device for plant growth.

* * * * *